(12) United States Patent
Lu

(10) Patent No.: US 9,502,967 B2
(45) Date of Patent: Nov. 22, 2016

(54) METHOD OF REUSING ELECTRICAL ENERGY AND RELATED ELECTRICAL ENERGY REUSING CIRCUIT

(71) Applicant: Sitronix Technology Corp., Hsinchu County (TW)

(72) Inventor: Hung-Yu Lu, Hsinchu County (TW)

(73) Assignee: Sitronix Technology Corp., Hsinchu County (TW)

( * ) Notice: Subject to any disclaimer, the term of this patent is extended or adjusted under 35 U.S.C. 154(b) by 95 days.

(21) Appl. No.: 14/190,095

(22) Filed: Feb. 26, 2014

(65) Prior Publication Data

US 2015/0137876 A1    May 21, 2015

(30) Foreign Application Priority Data

Nov. 20, 2013   (TW) .............................. 102142301 A

(51) Int. Cl.
    *G05F 1/10*     (2006.01)
    *H02M 3/07*    (2006.01)
    *H02M 1/00*    (2006.01)

(52) U.S. Cl.
    CPC ....... *H02M 3/07* (2013.01); *H02M 2001/0048* (2013.01); *H02M 2003/077* (2013.01); *Y02B 70/1491* (2013.01)

(58) Field of Classification Search
    CPC .................. H03F 1/0227; H03F 1/0277; H03F 3/195; H03F 3/245; H03F 2200/336
    See application file for complete search history.

(56) References Cited

U.S. PATENT DOCUMENTS

| | | | |
|---|---|---|---|
| 7,382,176 B2 * | 6/2008 | Ayres | H02M 3/073 327/536 |
| 2006/0132220 A1 * | 6/2006 | Lee | H02M 3/073 327/536 |
| 2010/0329067 A1 * | 12/2010 | Lim | G11C 8/08 365/230.06 |

FOREIGN PATENT DOCUMENTS

| | | |
|---|---|---|
| CN | 1475005 A | 2/2004 |
| CN | 1739230 A | 2/2006 |
| CN | 1832311 A | 9/2006 |
| CN | 203206110 U | 9/2013 |
| TW | 201230635 | 7/2012 |
| TW | 201244344 | 11/2012 |
| TW | 201324071 | 6/2013 |
| TW | 201342353 | 10/2013 |

\* cited by examiner

*Primary Examiner* — Sibin Chen
(74) *Attorney, Agent, or Firm* — Winston Hsu; Scott Margo

(57) ABSTRACT

The present disclosure provides a method of reusing electrical energy for a charge pump. The method comprises operating in a reusing phase after a boosting phase is completed; retrieving energy of parasitic capacitance in the reusing phase; and reusing the energy of the parasitic capacitance for an internal circuit.

12 Claims, 5 Drawing Sheets

METHOD OF REUSING ELECTRICAL ENERGY AND RELATED ELECTRICAL ENERGY REUSING CIRCUIT

BACKGROUND OF THE INVENTION

1. Field of the Invention

The present invention relates to a method of reusing electrical energy and related electrical energy reusing circuit, and more particularly, to a method of reusing electrical energy and related electrical energy reusing circuit for a charge pump.

2. Description of the Prior Art

Charge pumps are commonly used for the booster circuit or the voltage multiplier. For example, the liquid crystal display (LCD) uses the charge pump to boost the output voltage of a low power voltage source, providing a higher operation voltage for a source driver and gate driver.

When the charge pump performs boosting, it charges and discharges the parasitic capacitance generated by the internal circuit and repeats the cycle. However, consistently charging and discharging the parasitic capacitance causes extra power consumption.

SUMMARY OF THE INVENTION

It's therefore an objective of the present disclosure to provide a method of reusing electrical energy to effectively retrieve and reuse electrical energy of a parasitic capacitance of a charge pump.

A method of reusing electrical energy for a charge pump is disclosed. The method comprises operating in a reusing phase after a boosting phase is completed; retrieving energy of parasitic capacitance in the reusing phase; and reusing the energy of the parasitic capacitance for an internal circuit.

A driving circuit is disclosed. The driving circuit comprises at least one charge pump and an electrical energy reusing circuit. Each charge pump comprises a parasitic capacitance and an output capacitor for performing charging in a charging phase and performing boosting in a boosting phase. The electrical energy reusing circuit comprises an energy storage unit coupled to the parasitic capacitance of each charge pump for retrieving energy of parasitic capacitance in the reusing phase and reusing the energy of the parasitic capacitance for an internal circuit and a first switch coupled to the energy storage unit and the parasitic capacitance of each charge pump, for controlling a coupling relationship between the parasitic capacitance of each charge pump and the energy storage unit.

These and other objectives of the present invention will no doubt become obvious to those of ordinary skill in the art after reading the following detailed description of the preferred embodiment that is illustrated in the various figures and drawings.

DETAILED DESCRIPTION

It is understood that the terms or names used in the present disclosure for the specific elements might differ from the ones commonly used by the manufacturers. The present disclosure does not distinguish the elements by their terms or names. The elements are distinguished by their functionalities. Through the entire disclosure, the term "include" is an open-ended phrase, which means "include but not limited". Besides, the term "couple" includes any direct or indirect electrical coupling. If the description states "a first device is coupled to a second device", it means that the first device may be electrically coupled to the second device directly or electrically coupled to the second device through other devices.

Figure 1:
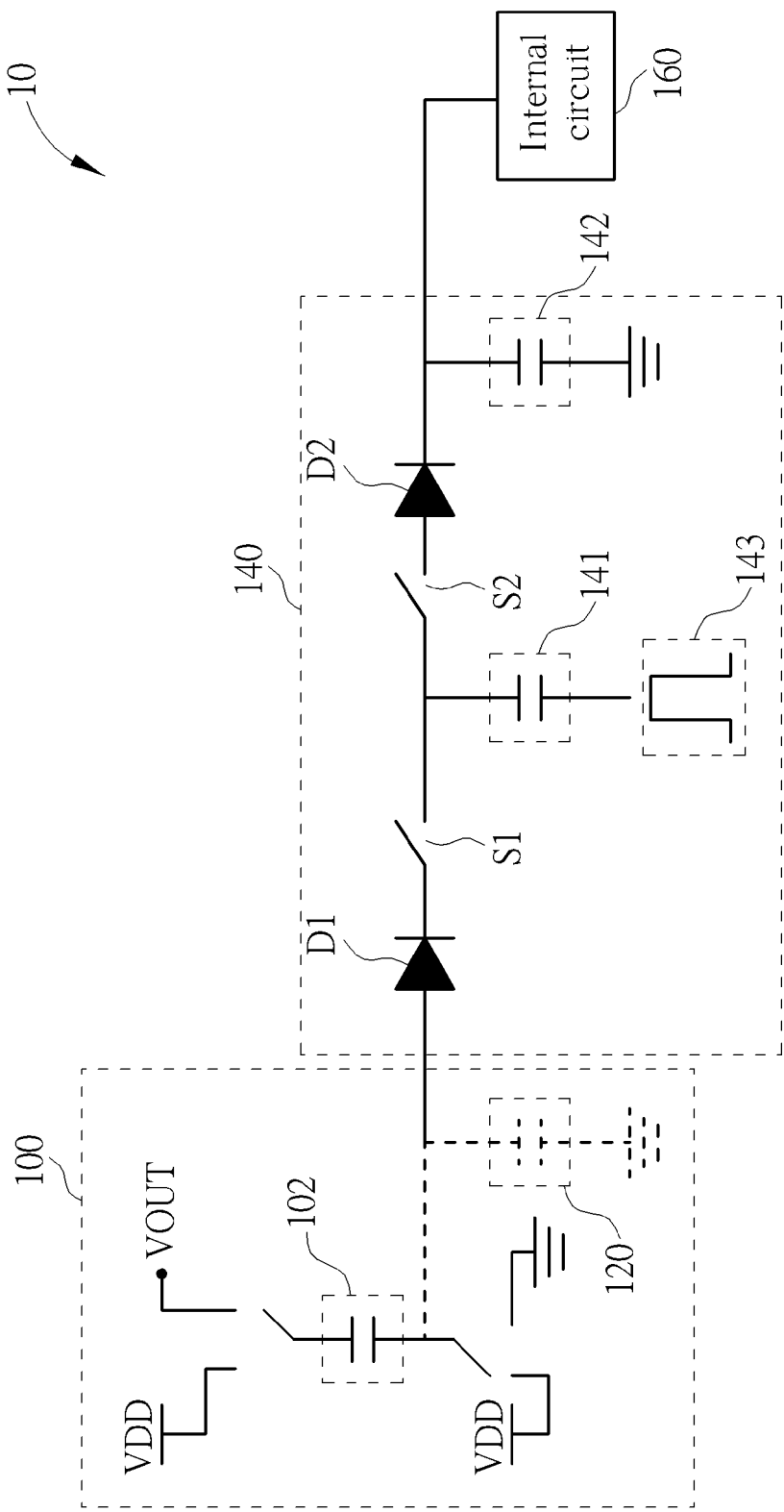
FIG. 1 is an exemplary schematic diagram of a driving chip.

Please refer to FIG. 1, which is an exemplary schematic diagram of a driving chip 10. The driving chip 10 includes a charge pump 100, an electrical energy reusing circuit 140 and an internal circuit 160. The charge pump 100 includes two voltage sources VDDs, an output terminal VOUT, an output capacitor 102 and a parasitic capacitance 120. The output capacitor 102 includes a first terminal and a second terminal. The first terminal of the output capacitor 102 could be coupled to one of the voltage sources VDDs or the output terminal VOUT or stay floating. The second terminal of the output capacitor 102 could be coupled to the other voltage source VDD or a ground terminal or stay floating. The charge pump 100 charges the output capacitor 102 in a charging phase and boots the output voltage through the output capacitor 102 in a boosting phase. The parasitic capacitance 120 is a parasitic capacitance between the output capacitor 120 and the ground terminal. The electrical energy reusing circuit 140 is coupled to the parasitic capacitance 120 for retrieving the electrical energy of the parasitic capacitance 120 and reusing the electrical energy of the parasitic capacitance 120. The internal circuit 160 is coupled to the electrical energy reusing circuit 140. The electrical energy reusing circuit 140 includes a first diode D1, a first switch D1, an energy storage unit 141, a second switch S2, a second diode D2, a voltage stabilizing unit 142 and a pulse generator 143. The energy storage unit 141 is coupled to the parasitic capacitance 120 for retrieving the electrical energy of the parasitic capacitance 120 and reusing the electrical energy of the parasitic capacitance 120 for the internal circuit 160. The energy storage unit 141 could be a capacitor or an inductor or any electrical element capable of storing electrical energy. The first diode D1 is coupled to the parasitic capacitance 120 for preventing a counter current of the energy storage unit 141 from flowing back in the parasitic capacitance 120. The first switch S1 is coupled between the parasitic capacitance 120 and the energy storage unit 141 for controlling a coupling relationship between the parasitic capacitance 120 and the energy storage unit 141. The voltage stabilizing unit 142 is coupled to the energy storage unit 141 for stabilizing an output voltage of the energy storage unit 141. The second diode D2 is coupled between the energy storage unit 141 and the voltage stabilizing unit 142 for preventing a counter current of the voltage stabilizing unit 142 from flowing back in the energy storage unit 141. The second switch S2 is coupled to the voltage stabilizing unit 142 for controlling a coupling relationship between the energy storage unit 141 and the voltage stabilizing 142. The pulse generator is coupled to the energy storage unit 141 for controlling an initial voltage of the energy storage unit 141 for increasing capacity of the energy storage unit 141. Moreover, the diodes D1 and D2 in the present disclosure are used for preventing the counter current from flowing back. In some example, the diodes D1 and D2 are not required for the electrical energy circuit 140.

The detailed operation of the driving chip 10 is elaborated as follows. In the charging phase, the charge pump 100 performs charging by coupling the first terminal of the output capacitor 100 to the voltage source VDD, coupling the second terminal of the output capacitor 102 to the ground terminal and turning the first switch on. The charge pump 100 starts charging. In the boosting phase, the first terminal of the output capacitor 102 is coupled to the output terminal VOUT, the second terminal of the output capacitor 102 is coupled to the voltage source VDD and the first switch is turned on. This allows the charge pump 100 to perform boosting. After the boosting phase is completed but before the next charging phase starts comes a reusing phase, which allows the parasitic capacitance 120 to charge the electrical energy reusing circuit 140. In the reusing phase, the first terminal of the output capacitor 102 is coupled to the voltage source VDD after the parasitic capacitance 120 is charged to the voltage VDD. The second terminal of the output capacitor 102 stays floating, the first switch S1 is off and the second switch S2 is on. Thus, the electrical energy of the parasitic capacitance 120 is stored in the energy storage unit 141. Through the energy storage unit 141, the electrical energy of the parasitic capacitance 120 can be retrieved and reused. The first diode D1 is coupled to the parasitic capacitance 120 for preventing the counter current of the energy storage unit 141 from flowing back to the parasitic capacitance 120. The pulse generator 143 can generate a negative pulse to draw an initial voltage of the energy storage unit 141 to a negative voltage. When the parasitic capacitance 120 starts charging the energy store unit 141, the voltage of the energy storage unit 141 goes from negative to positive. The greater the negative voltage goes the more electrical energy unit 141 can retrieve from the parasitic capacitance 120. In other words, the capacity of the energy storage unit 141 can be controlled by the volume of the negative voltage. When the electrical energy reusing circuit 140 reuses the electrical energy of the parasitic capacitance 120 for the internal circuit 160, the switch S1 is turned on and the switch S2 is turned off. The energy storage unit 141 can provide the stored electrical energy for the internal circuit 160. The voltage stabilizing unit 142 is used for stabilizing an output voltage of the energy storage unit 141. The second diode D2 is coupled between the energy storage unit 141 and the voltage stabilizing unit 142 for prevent the counter current of the voltage stabilizing unit 142 from flowing back the energy storage unit 141. Preferably, the voltage stabling unit 142 can be a capacitor or an inductor.

Briefly, the electrical energy reusing circuit 140 retrieves the electrical energy of the parasitic capacitance 120 and reuses the electrical energy of the parasitic capacitance 120 for the internal circuit after the boosting phase is completed and before the next charging phase starts. This, thus, reduces the power consumption for the driving chip 10.

Figure 2:
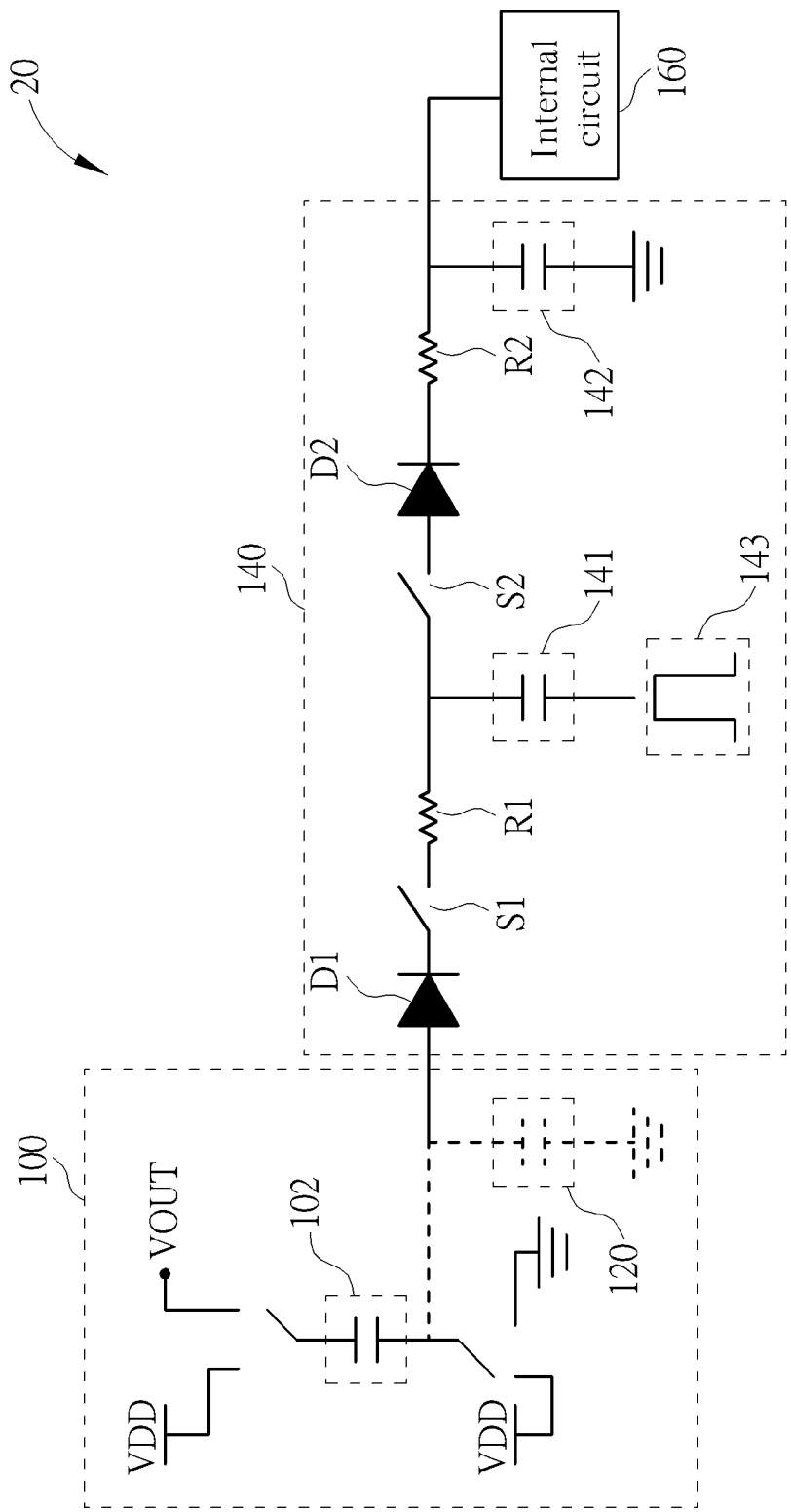
FIG. 2 is an exemplary schematic diagram of another driving chip.

In some examples, each of the energy storage unit 141 and the voltage stabilizing unit 142 is individually coupled to a resistor to limit the current flowing to the energy storage unit 141 and the voltage stabilizing unit 142. Please refer to FIG. 2, which is an exemplary schematic diagram of another driving chip 20. The basic structure of the driving chip 20 is similar to the structure of the driving chip 10 so the same reference numbers or labels represent the same elements. In the driving chip 20, a resistor R1 is coupled to the energy storage unit 141 and a resistor R2 is coupled to the voltage stabilizing unit 142. The resistors R1 and R2 are used for limiting the current flowing to the energy storage unit 141 and the voltage stabilizing unit 142, respectively. Besides, a characteristic of a filter can be defined by adjusting the resistance of the resistors R1 and R2 and the capacitance of the energy storage unit 141 and the voltage stabilizing unit 142. Further, diodes D1 and D2 shown in FIG. 2 are used for preventing counter current from flowing back. In other examples, the diodes D1 and D2 are not required for the electrical energy reusing circuit 140.

Figure 3:
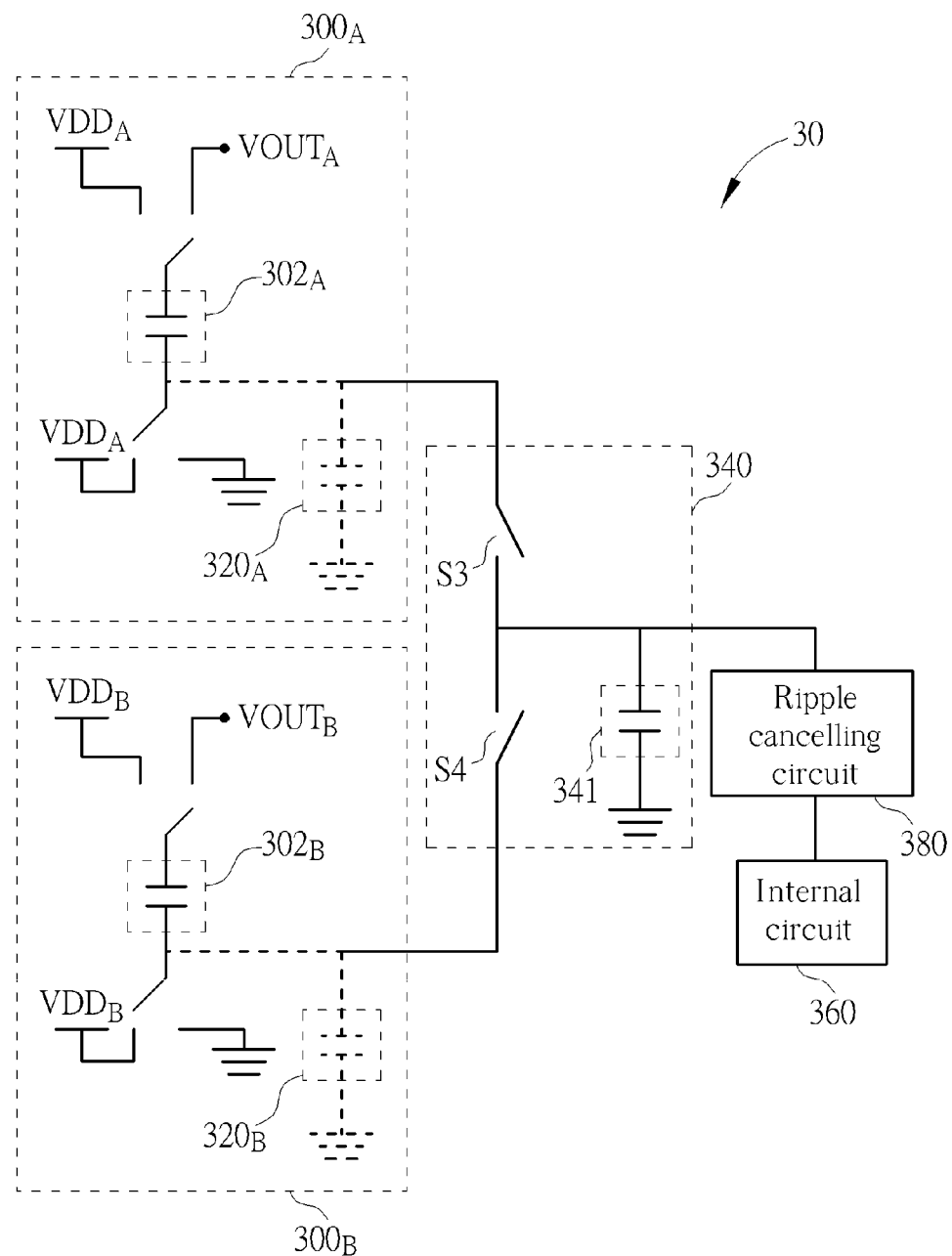
FIG. 3 is an exemplary schematic diagram of still another driving chip.

Please refer to FIG. 3, which is an exemplary schematic diagram of yet another driving chip 30. The driving chip 30 includes charge pumps $300_A$ and $300_B$, an electrical energy reusing circuit 340 and an internal circuit 360. The basic structures of the charge pumps $300_A$ and $300_B$ are similar to the charge pump 100, thus the detailed operation is omitted herein. A label of each element includes a subscript A or B, which means that the element belongs to the charge pump $300_A$ or $300_B$. The electrical energy reusing circuit 340 is coupled to the charge pumps $300_A$ and $300_B$, for retrieving the electrical energy from the parasitic capacitances $320_A$ and $320_B$ and reusing the electrical energy for the internal circuit 360. In this example, the charge pumps $300_A$ and $300_B$ share the electrical energy reusing circuit 340. The electrical energy reusing circuit 340 includes switches S3 and S4 and an energy storage unit 341. The operation of the energy storage unit 314 is the same as the energy storage unit 140 and the detailed operation is omitted herein. The electrical energy reusing circuit 340 retrieves the electrical energy of the parasitic capacitance $320_A$ of the charge pump $300_A$ and the parasitic capacitance $320_B$ of the charge pump $300_B$ through the switches S3 and S4, respectively. According to the description of the boosting phase and the charging phase above, the switch S3 is on and the switch S4 is off and the parasitic capacitance $320_B$ charges the electrical energy reusing circuit 340 when the charge pumps $300_A$ and $300_B$ operate in the reusing phase and the boosting phase, respectively. When the charge pumps $300_A$ and $300_B$ operate in the boosting phase and the charging phase, respectively, the switches S3 and S4 both are on. When the charge pumps $300_A$ and $300_B$ operate in the reusing phase and the boosting phase the switch S3 is off and the switch S4 is on, the parasitic capacitance $320_A$ charges the electrical energy reusing circuit 340. When the charge pumps $300_A$ and $300_B$ operate in the charging phase and the boosting phase, respectively, the switches S3 and S3 both are on. The driving chip 30 can further include a ripple cancelling circuit 380. The ripple cancelling circuit 380 is coupled between the electrical energy reusing circuit 340 and the internal circuit 360, for eliminating the ripples and stabilizing an output voltage of the electrical energy reusing circuit 340. General speaking, the ripple cancelling circuit 380 is not required for the driving chip 30 if the example of the present disclosure is used in a digital circuit. If the example of the present disclosure is used in an analog circuit, the ripple cancelling 380 might be exploited. The ripple cancelling circuit can be implemented by a low dropout regulator (LDO).

Figure 4:
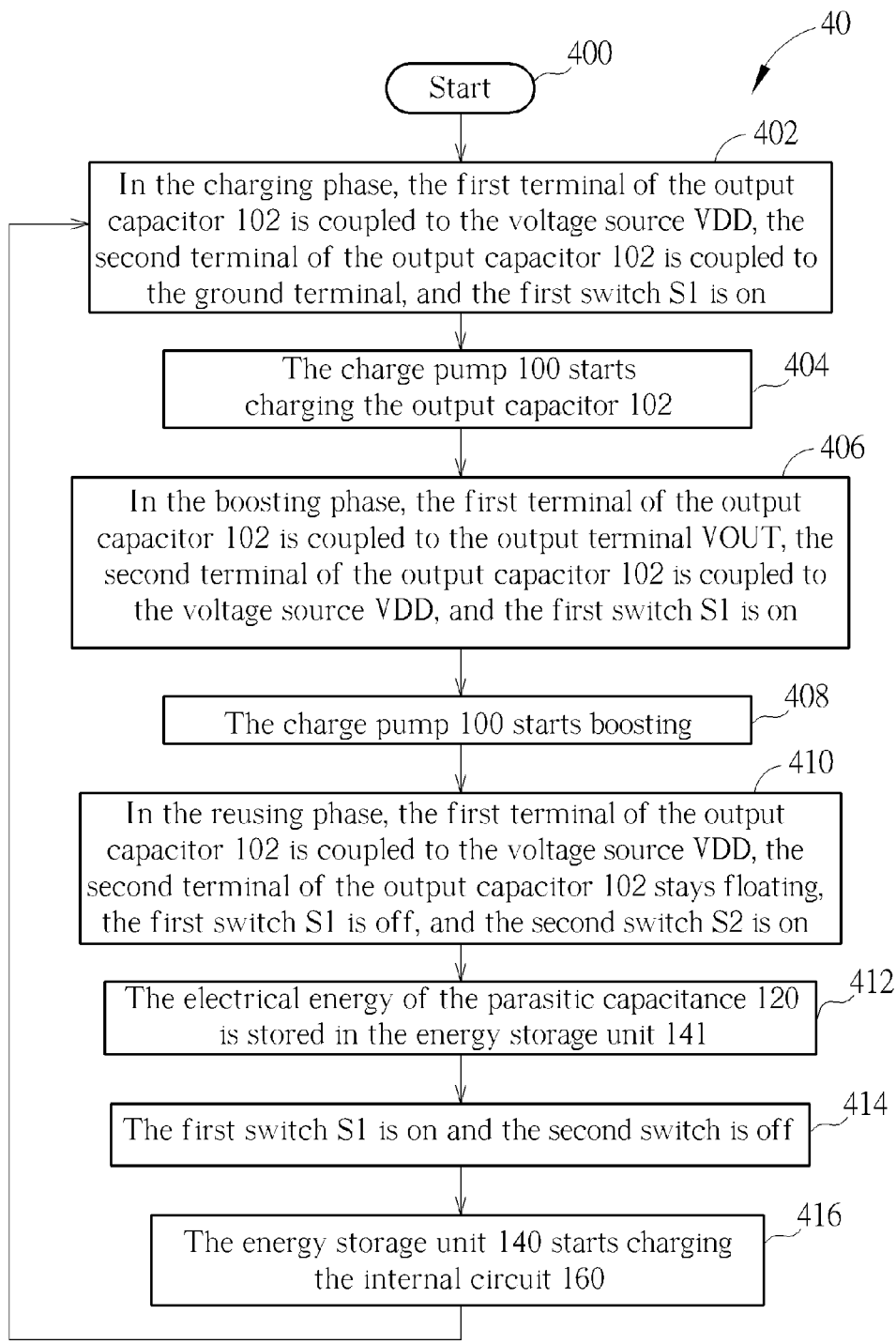
FIG. 4 is an exemplary flow chart of an electrical energy reusing process.

The detailed operation of the driving chip 10 above can be synthesized into an electrical energy reusing process 40. FIG. 4 is an exemplary flow chart of the electrical energy reusing process 40. The electrical energy reusing process 40 can be used in the driving chip 10 for retrieving and reusing the electrical energy of the parasitic capacitance of the charge pump 100. The electrical energy reusing process 40 includes the following steps:

Step 400: Start.

Step 402: In the charging phase, the first terminal of the output capacitor 102 is coupled to the voltage source VDD, the second terminal of the output capacitor 102 is coupled to the ground terminal, and the first switch S1 is on.

Step 404: The charge pump 100 starts charging the output capacitor 102.

Step 406: In the boosting phase, the first terminal of the output capacitor 102 is coupled to the output terminal VOUT, the second terminal of the output capacitor 102 is coupled to the voltage source VDD, and the first switch S1 is on.

Step 408: The charge pump 100 starts boosting.

Step 410: In the reusing phase, the first terminal of the output capacitor 102 is coupled to the voltage source VDD, the second terminal of the output capacitor 102 stays floating, the first switch S1 is off, and the second switch S2 is on.

Step 412: The electrical energy of the parasitic capacitance 120 is stored in the energy storage unit 141.

Step 414: The first switch S1 is on and the second switch is off.

Step 416: The energy storage unit 140 starts charging the internal circuit 160.

According to the electrical energy reusing process 40, the electrical energy of the parasitic capacitance 120 can be retrieved and reused. The detail description can be found above, and thus omitted herein.

Figure 5:
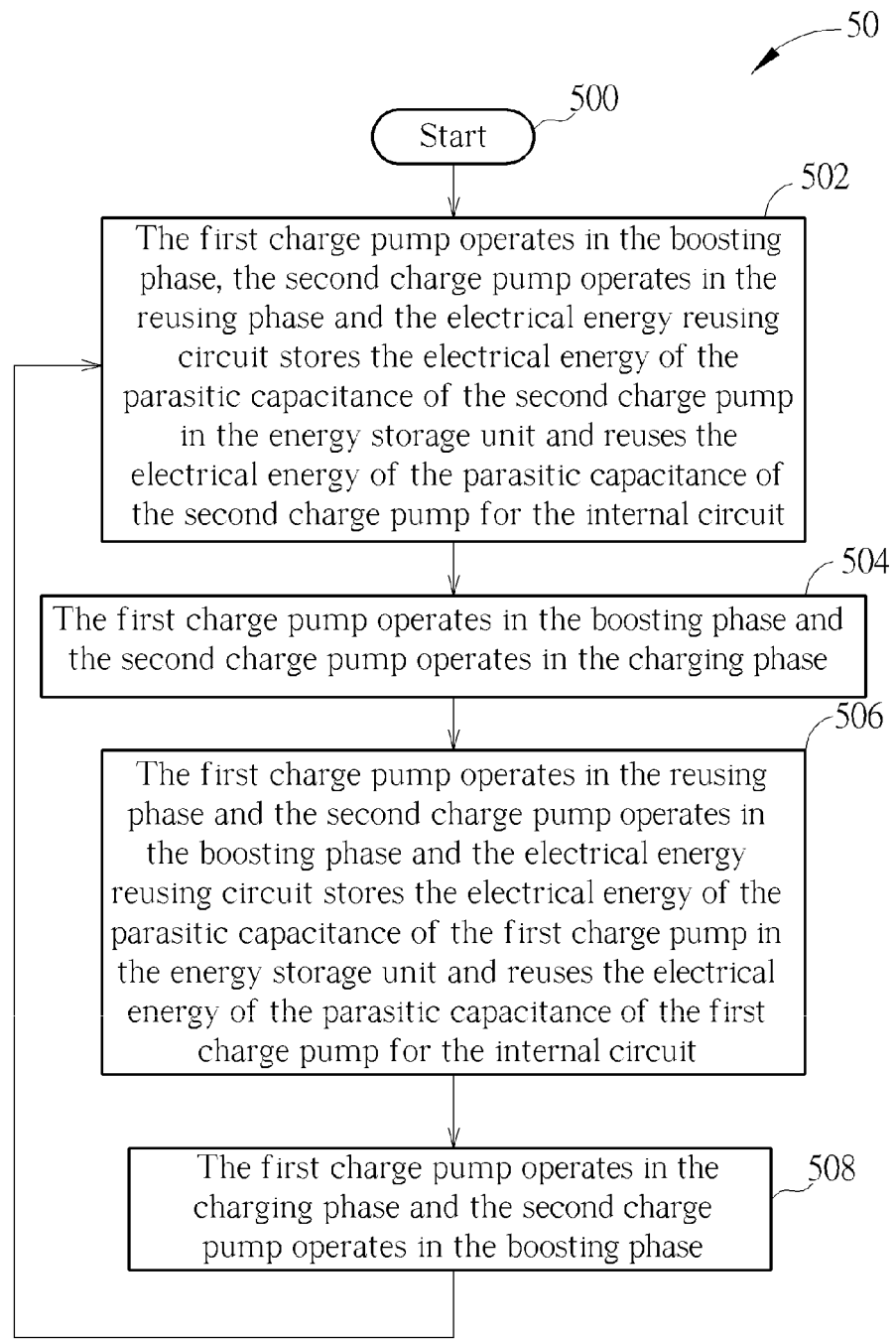
FIG. 5 is an exemplary flow chart of another electrical energy reusing process.

The detailed operation of the driving chip 30 above can be synthesized into an electrical energy reusing process 50. FIG. 5 is an exemplary flow chart of the electrical energy reusing process 50. The electrical energy reusing process 50 can be used in a driving chip with multiple charge pumps (e.g. driving chip 30) for retrieving and reusing the electrical energy of the parasitic capacitance of the multiple charge pumps. The electrical energy reusing process 50 includes the following steps:

Step 500: Start.

Step 502: The first charge pump operates in the boosting phase, the second charge pump operates in the reusing phase and the electrical energy reusing circuit stores the electrical energy of the parasitic capacitance of the second charge pump in the energy storage unit and reuses the electrical energy of the parasitic capacitance of the second charge pump for the internal circuit.

Step 504: The first charge pump operates in the boosting phase and the second charge pump operates in the charging phase.

Step 506: The first charge pump operates in the reusing phase and the second charge pump operates in the boosting phase and the electrical energy reusing circuit stores the electrical energy of the parasitic capacitance of the first charge pump in the energy storage unit and reuses the electrical energy of the parasitic capacitance of the first charge pump for the internal circuit.

Step 508: The first charge pump operates in the charging phase and the second charge pump operates in the boosting phase.

The detailed description of the electrical energy reusing process 50 can be found above, thus omitted herein. Please note that the electrical energy reusing process 50 can use multiple switches to switch to the reusing phase for each charge pump, in order to reuse the electrical energy of the multiple charge pumps. The number of the multiple charge pumps is not limited to two.

To sum up, the examples of the present disclosure can retrieve the electrical energy of the parasitic capacitance and reuse the electrical energy of the parasitic capacitance for the internal circuit or a voltage source. In this situation, the power consumption can be reduced.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of reusing electrical energy for a charge pump and an electrical energy reusing circuit, the charge pump comprising a parasitic capacitance and an output capacitor, the output capacitor comprising a first terminal coupled to a voltage source or an external output terminal or staying floating and a second terminal coupled to the voltage source or staying floating, the electrical energy reusing circuit comprising an energy storage unit coupled to the parasitic capacitance, a first switch coupled to the energy storage unit and the parasitic capacitance, a voltage stabilizing unit coupled to the energy storage unit, a second switch coupled to the energy storage unit and the voltage stabilizing unit, a first diode coupled to the energy storage unit and the parasitic capacitance, and a second diode coupled to the energy storage unit and the voltage stabilizing unit, the method comprising:

operating in a reusing phase after a boosting phase is completed;

retrieving, by the energy storage unit, electrical energy of the parasitic capacitance in the reusing phase;

reusing, by the energy storage unit, the electrical energy of the parasitic capacitance for an internal circuit;

controlling, by the first switch, a coupling relationship between the parasitic capacitance and the energy storage unit;

stabilizing, by the voltage stabilizing unit, an output voltage of the energy storage unit;

controlling, by the second switch, a coupling relationship between the energy storage unit and the voltage stabilizing unit;

preventing, by the first diode, a counter current of the energy storage unit from flowing back in the parasitic capacitance; and preventing, by the second diode, a counter current of the voltage stabilizing unit from flowing back in the energy storage unit;

wherein the parasitic capacitance is directly connected between the second terminal and a ground end.

2. The method of claim 1 further comprising:

operating in a charging phase after the reusing phase is completed;

charging an output capacitor in the charging phase;

operating in the boosting phase after the charge phase is completed; and performing boosting through the output capacitor in the boosting phase.

3. The method of claim 2 further comprising coupling a first terminal of the output capacitor to a voltage source and floating a second terminal of the output capacitor.

4. The method of claim 1, wherein the step of retrieving electrical energy of the parasitic capacitance comprises:

charging the energy storage unit to store the electrical energy of the parasitic capacitance.

5. The method of claim 4, wherein the energy storage unit is a capacitor or an inductor.

6. The method of claim 4 further comprising: controlling an initial voltage of the energy storage unit to increase or decrease a capacity of the energy storage unit.

7. A driving circuit comprising:
at least one charge pump, each charge pump comprising:
- a parasitic capacitance; and
- an output capacitor, comprising a first terminal coupled to a voltage source or an external output terminal or staying floating and a second terminal coupled to the voltage source or staying floating, for performing charging in a charging phase and performing boosting in a boosting phase; and an electrical energy reusing circuit comprising:
- an energy storage unit coupled to the parasitic capacitance of the each charge pump for retrieving electrical energy of the parasitic capacitance and reusing the electrical energy of the parasitic capacitance for an internal circuit in the reusing phase; and
- a first switch coupled to the energy storage unit and the parasitic capacitance of the each charge pump, for controlling a coupling relationship between the parasitic capacitance of the each charge pump and the energy storage unit;

wherein the parasitic capacitance is directly connected between the second terminal and a ground end;

wherein the electrical energy reusing circuit further comprises:
- a voltage stabilizing unit coupled to the energy storage unit for stabilizing an output voltage of the energy storage unit; and
- a second switch coupled to the energy storage unit and the voltage stabilizing unit for controlling a coupling relationship between the energy storage unit and the voltage stabilizing unit;

wherein the electrical energy reusing circuit further comprises:
- a first diode coupled to the energy storage unit and the parasitic capacitance of the each charge pump, for preventing a counter current of the energy storage unit from flowing back in the parasitic capacitance; and
- a second diode coupled to the energy storage unit and the voltage stabilizing unit, for preventing a counter current of the voltage stabilizing unit from flowing back in the energy storage unit.

8. The driving circuit of claim 7, wherein the electrical energy reusing circuit further comprises:
- a first resistance unit coupled to the energy storage unit, for limiting a first current flowing into the energy storage unit; and
- a second resistance unit coupled to the voltage stabilizing unit for limiting a second current flowing into the voltage stabilizing unit.

9. The driving circuit of claim 7, wherein the energy storage unit is a capacitor or an inductor.

10. The driving circuit of claim 7, wherein the voltage stabilizing unit is a capacitor or an inductor.

11. The driving circuit of claim 7, wherein the electrical energy reusing circuit further comprises a pulse generator coupled to the energy storage unit, for controlling an initial voltage of the energy storage unit to increase or decrease a capacity of the energy storage unit.

12. The driving circuit of claim 7, wherein the at least one charge pump enters the boosting phase from the charging phase and enters the reusing phase from the boosting phase and further returns to the charging phase from the reusing phase.

* * * * *